United States Patent [19]

Baker

[11] Patent Number: 5,046,376
[45] Date of Patent: Sep. 10, 1991

[54] SHAFT LOCKING OR MANUAL OPERATING APPARATUS

[75] Inventor: Gerald S. Baker, Houston, Tex.

[73] Assignee: Cooper Industries, Inc., Houston, Tex.

[21] Appl. No.: 679,918

[22] Filed: Apr. 3, 1991

[51] Int. Cl.⁵ .......................................... F16K 31/143
[52] U.S. Cl. ............................. 74/424.8 VA; 251/14; 251/89; 192/8 C
[58] Field of Search .................. 251/14, 89; 74/424.8 VA, 625; 192/8 C

[56] References Cited

U.S. PATENT DOCUMENTS

| | | | |
|---|---|---|---|
| 3,378,224 | 4/1988 | Boyle | 251/14 |
| 3,539,041 | 11/1970 | Sacchini | 192/8 C |
| 3,628,397 | 12/1971 | Sheesley | 74/625 |
| 4,189,950 | 2/1980 | Killian | 74/424.8 A |
| 4,194,718 | 3/1980 | Baker | 251/14 |
| 4,213,480 | 7/1980 | Orum | 251/14 X |
| 4,623,051 | 11/1986 | Lochnoeller | 192/8 C |
| 4,747,320 | 5/1988 | Nilsson | 192/8 C X |
| 4,844,407 | 7/1989 | Baker | 251/14 |

Primary Examiner—Alan Cohan

[57] ABSTRACT

A manual operator which is useful when used with a valve or other type of device to provide either manual operation of the valve in one direction or to provide a stop against the movement of the valve away from one of its extreme positions. The device includes a ball nut, screw shaft and balls positioned in facing grooves in the nut and shaft so that relative rotation has very low friction. Thus rotation of one of the nut or screw shaft results in axial movement of the screw shaft so that it can move or provide a stop. Aligned adjacent exterior surfaces are provided on a rotating part of the device and one a stationary part of the device which surfaces are engaged by a locking spring which can be release from such surfaces when it is desired that the manual operator cause an axial movement of screw shaft. In one form of the invention the screw shaft rotates and the ball nut is stationery. In another form the ball nut rotates and the screw shaft is stationary. In a third form two locking springs are provided to lock against inadvertent relative rotation in both directions. In still another form of the apparatus, it is applied to a blowout preventer ram tail rod so that the axial movement of the tail rod is translated into rotation of a ball nut and a spring engages a surface rotating with the ball nut and a stationary aligned surface to prevent relative rotation in one direction to lock the tail rod with the piston in its inner or ram closed position.

18 Claims, 13 Drawing Sheets

SHAFT LOCKING OR MANUAL OPERATING APPARATUS

BACKGROUND

The present invention relates to an improved apparatus which may be used as a manual operating apparatus or as a shaft locking apparatus with valves, chokes and other devices which have a remotely operated actuator including an axially moving stem or shaft to manually move the stem or shaft to one of its extreme positions and lock it in such position until the improved operator is released or manually moved to allow such movement.

Prior to the present invention, there have been many designs of manual operators or override mechanisms to be used with valves to move the valve stem against the force which is developed on the valve stem responsive to the fluid pressure which is present in the valve chamber and also against the force on the stem by a return spring, if one is used. U.S. Pat. No. 4,844,407 is an example of such prior manual operator and override mechanisms.

U.S. Pat. No. 4,194,718 Baker et al is an example of the prior art of such override mechanisms as applied to a choke and which can be operated by a handwheel. It includes means for releasably connecting the manual operator to the gate to manually move the gate and for releasing the manual operator from the gate to allow such movement.

U.S. Pat. No. 3,378,224 to Boyle discloses a gate valve which is piston actuated together with a handwheel having a sleeve threaded on the shaft which extends through the piston. Rotation of the handwheel causes movement of both the piston and the valve member.

U.S. Pat. No. 4,189,980 discloses a manual control apparatus which has a split drive nut and a camming system which coacts with the rotation system for bringing the split drive nut into engagement with the threaded drive screw and rotating the split nut to move the drive screw and the valve member connected thereto.

U.S. Pat. No. 3,628,397 discloses a valve member having a ball nut secured to the upper portion of the piston and a ball shaft secured to the top of the bonnet and mounted so that its rotation causes movement of the piston and valve member. During normal operation, movement of the piston will cause rotation of the ball shaft.

U.S. Pat. No. 4,213,480 discloses an override mechanism for a valve in which a nut is threaded onto the drive stem and is engaged by a drive sleeve which telescopes onto the nut and splines connect the sleeve to the nut. Rotation of the sleeve rotates the nut which contacts one of the abutment surfaces and then causes movement of the gate.

The prior devices have had the problem of being difficult to turn in both directions when the valve chamber is pressurized. At times the force of such pressure is sufficient to allow unlocking or opening without releasing the fluid pressure to which the stem is exposed.

SUMMARY

The improved apparatus of the present invention is suitable for use on a valve, such as a gate valve, a choke or a blowout preventer that has an actuator for moving the valve member to control flow through the valve. The operator is connected to be positioned around the upper or outer end of the valve stem and extend outwardly therefrom. The apparatus includes means for engaging the outer end of the stem and means for locking the stem in any position. The locking means includes a ball nut, a ball screw shaft, balls forming the threaded connection between the ball screw shaft and the ball nut with one of the nut and the shaft being retained against rotation and the other rotating within the apparatus, a first stationary cylindrical surface, a second rotational surface and a spring closely engaging both of said surfaces with the spring preventing relative rotation between the surfaces in one direction and having means for release of the spring to allow relative rotation between said surfaces and thus the axial movement of the stem. An object of the present invention is to provide an improved apparatus for preventing axial movement of a shaft which can be used as a shaft lock or as a manual operator for the shaft.

Another object of the present invention is to provide an improved manual operator which is suitable for connection to a valve to be easily moved and which locks the valve stem in its innermost position.

A further object is to provide an improved manual operator for use with a valve to move its valve stem, which operator can be moved with a minimum of torque on a handwheel but which locks against substantial end loading of the valve stem without changing the torque required to move the valve stem.

Still another object is to provide an improved manual operator which may be used by a remote operated vehicle to allow simple rotation of subsea equipment and locking of the equipment in the position to which it has been moved.

BRIEF DESCRIPTION OF THE DRAWINGS

These and other objects and advantages of the present invention are hereinafter described and explained with respect to the drawings wherein.

DESCRIPTION OF THE PREFERRED EMBODIMENTS

Figure 1:
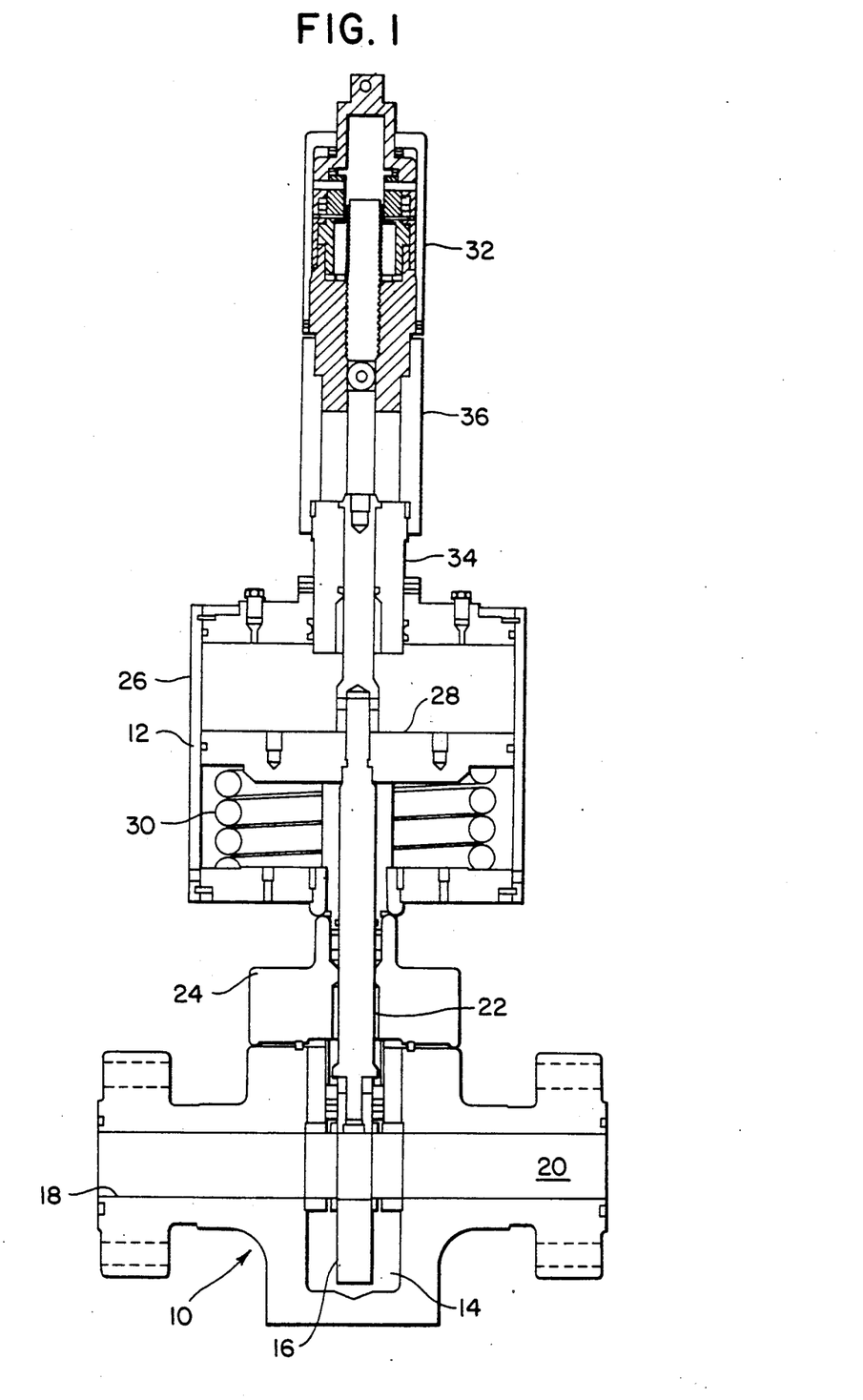
FIG. 1 is a sectional view of the preferred form of valve operator of the present invention installed on a valve in a position in which the operator is controlling the valve stem to retain it in the down or open position.

Valve 10, as shown in FIG. 1, is a gate valve with a piston actuator 12 and includes internal valve chamber 14 in which gate 16 is movably position. It also includes inlet 18 and outlet 20 communicating to opposite sides of gate 16 within chamber 14. Actuator 12 includes stem 22 which extends through bonnet 24 and engages gate 16. Actuator 12 includes housing 26 secured to bonnet 24 with piston 28 positioned therein and spring 30 urging piston 28 away from bonnet 24. Suitable means is provided to supply fluid under pressure into actuator housing 26 for movement of piston 28 downward and normally spring 30 and the pressure on gate 16 in chamber 14 will be sufficient for the upward movement of piston 28 and gate 16. Manual operator 32 is secured to collar 34 on the upper end of piston housing 26. The upper end of stem 22 is positioned within operator 32 as shown in FIG. 1.

Figure 2:
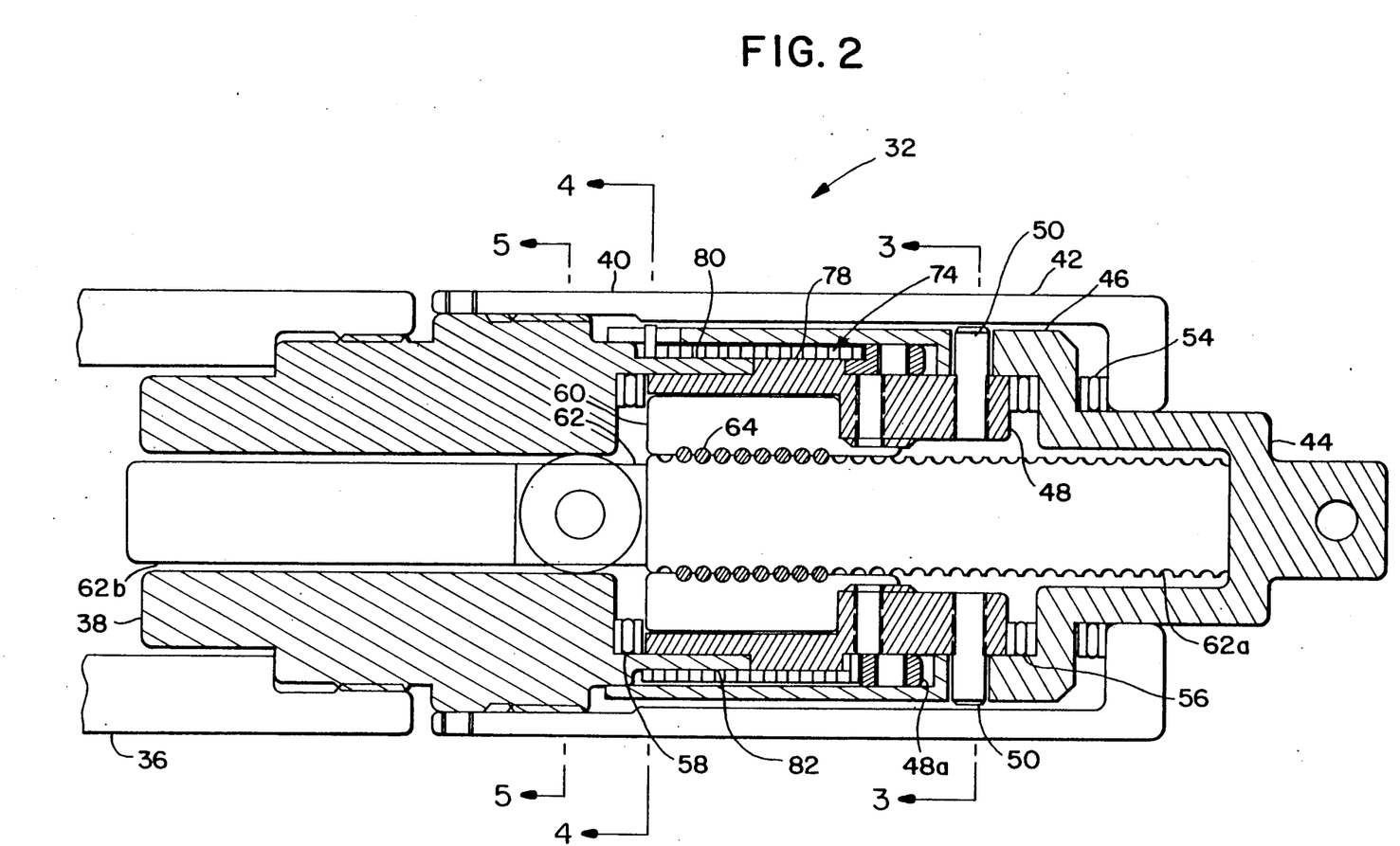
FIG. 2 is a longitudinal sectional view of the device of the present invention in its retracted position in which it is not controlling the valve stem.
Figure 3:
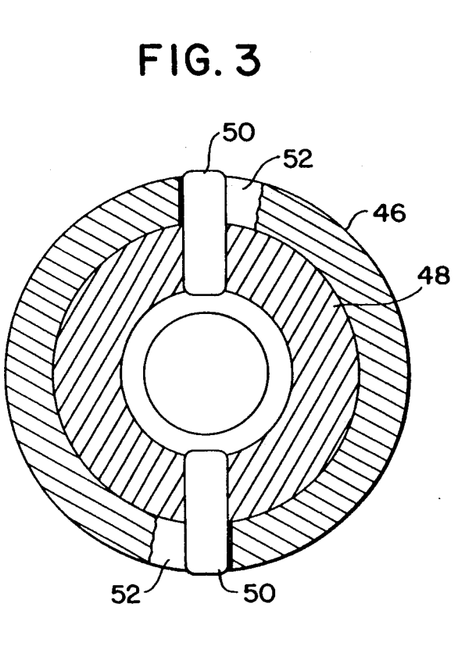
FIG. 3 is a transverse sectional view taken along line 3—3 in FIG. 2 and illustrating the at rest position of the operating sleeve and the nut drive sleeve.
Figure 5:
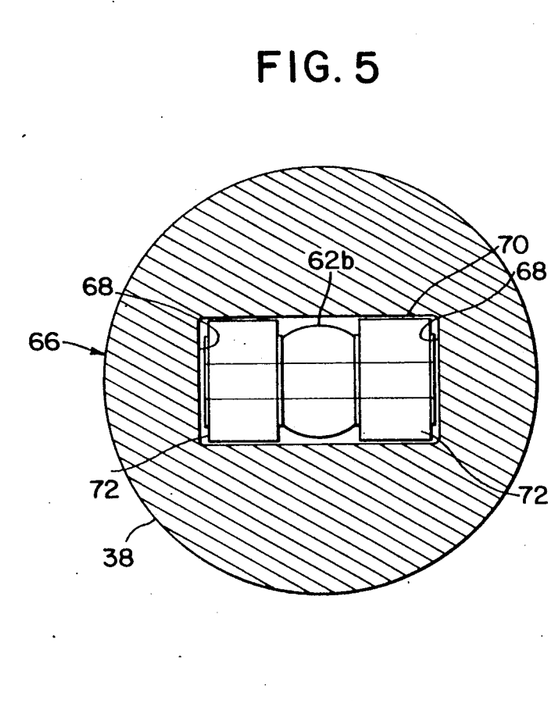
FIG. 5 is another transverse sectional view taken along line 5—5 in FIG. 2 and illustrating the rollers riding on a shaft through the nut shaft and engaging within recesses in the shaft guide sleeve.

Operator 32 includes sleeve 36 which is secured around collar 34 and operator screw shaft guide 38 as by threading or other suitable means as best seen in FIG. 2. Operator housing 40 includes both sleeve 36 and cap 42 with cap 42 also being similarly secured to screw shaft guide 38. These elements of operator 32, being secured to collar 34, are thus held stationary while other elements of operator 32 are rotated as hereinafter explained. A rotary means 44 is provided to translate rotary motion imparted by rotation of operating sleeve 46 which has an outer end 47 to receive a suitable manual rotating device such as a handwheel (not shown) and extends within housing 40. Operating sleeve 46 is secured to rotary collar 48 by pins 50 with a small space slot 52 (FIG. 3) in operating sleeve 46 to allow initial movement thereof without imparting movement to rotary collar 48. Bearings 54, 56 and 58 are positioned to allow relatively friction free rotation of operating sleeve 46 and collar 48 and other rotary elements with respect to housing 40. Rotary collar 48 is suitably secured to ball nut 60 which rotates with respect to ball screw shaft 62 with the balls 64 being in the spaces between ball nut 60 and ball screw shaft 62. Ball screw shaft 62 includes outer threaded portion 62a and inner unthreaded portion 62b and is held against rotation by means 66 (shown in FIG. 5) which coact with shaft guide 38. Such means 66 includes internal opposed axial recesses 68 which receive projections 70 extending from opposite sides of unthreaded portion 62b of ball screw shaft 62. Projections 70 are preferably suitable rollers 72 which are mounted in the outer portion of unthreaded portion 62b of ball screw shaft 62.

Figure 4:
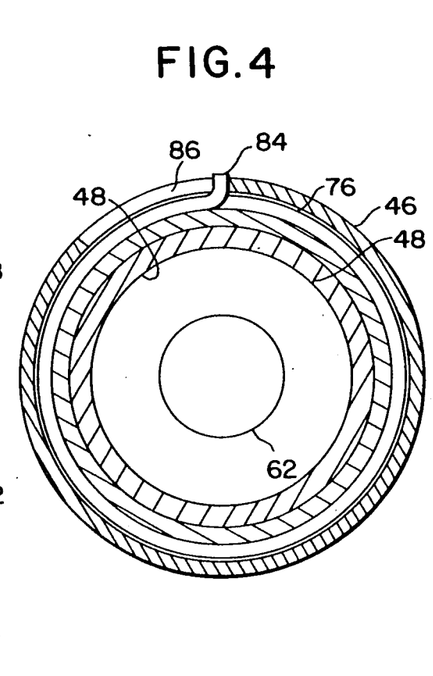
FIG. 4 is a transverse sectional view taken along line 4—4 in FIG. 2 and illustrating the position of the locking spring release tang.

Means 74 (shown in FIGS. 2 and 4) is provided to retain ball nut 60 and rotary collar 48 against counterclockwise rotation with respect to housing 40 and ball screw shaft guide 38. Such retaining means 74 includes spring 76 which coacts with outer surfaces 78 and 80, respectively, on rotary collar 48 and on rim 82 which projects outward from ball screw shaft guide 38. One end of spring 76 includes outwardly extending tang 84 which is positioned in slot 86 in the inner end of operating sleeve 46. The other end of spring 76 is secured to ring 48a which is secured to rotary collar 48. Since spring 76 functions as a lock to prevent relative counterclockwise rotation between rotary collar 48 and ball screw shaft guide 38, it is wound to fit tightly against surfaces 78 and 80 and to have sufficient inward force to prevent relative counter-clockwise rotation of such surfaces and thus lock ball screw shaft 62 in its axial position to prevent outward movement when spring 76 is allowed to grip such surfaces. When relative clockwise torque is applied to operating sleeve 46, spring 76 automatically disengages from surface 80, allowing spring 76 and rotary collar 48 to rotate freely in the clockwise direction. This is because spring 76 is wound with right hand coils which will self de-energize when there is relative clockwise rotation between the ends of the spring. Thus, the spring 76 only locks to prevent relative counter-clockwise rotation between rotary collar 48 and ball screw shaft guide 38.

When it is desired to allow shaft 62 to move axially outward or to move it axially outward responsive to counter-clockwise rotation of operating sleeve 46, it is only necessary to rotate operating sleeve 46 counterclockwise a small amount so that its engagement of tang 84 causes tang 84 to move a slight amount in a counterclockwise direction which increases the inner diameter of spring 76 so that its engagement of surfaces 78 and 80 is released. This allows shaft 62 to be moved axially from the position shown in FIG. 1 to the retracted position shown in FIG. 2. Also, in the extended position with spring 76 in its locking engagement with surfaces 78 and 80, shaft 62 will be held in engagement with the outer end of valve stem 22 with sufficient force to prevent its movement responsive to the force of spring 30 and the fluid pressure within valve chamber 14. However, when in such extended position, the slight counter-clockwise rotation of operating sleeve 46 to relax spring 76 will allow movement of stem 22 responsive to the force of spring 30 and the fluid pressure within valve chamber 14. 1 This relative ease of movement is the result of the bearing mounting of the rotary components within housing 40 and the ball screw combination which allows relatively small turning force to be used in the movement of screw shaft 62. It should be noted that when spring 76 is wound in the clockwise direction it will lock against counter-clockwise movement, but will slip freely in the clockwise direction. The reverse is true of a spring which is wound in the counter-clockwise direction.

Spring 76 is preferred to be a spring made of a high strength spring steel wire having a square or rectangular cross-section. As it is tightly wound, the coils are close to touching, and its inner diameter before installation in manual operator 32 is slightly smaller than the diameter of the surfaces 78 and 80. For example, if the surfaces 78 and 80 have a diameter of approximately 4 inches, then it is preferred that the inner diameter of spring 76 before being installed on such surfaces be between 0.010 and 0.020 inches smaller than the diameter of the surfaces. With this configuration of spring 76, engagement of the surfaces 78 and 80 is ensured whenever spring 76 has not been positively twisted to relax its engagement with such surfaces. Also with the square wire being used, the flat inner surface of spring 76 gives a larger area of engagement with such surfaces and also provides the maximum mass of spring for strength as compared to either a round or a half-round wire spring.

Figure 6:
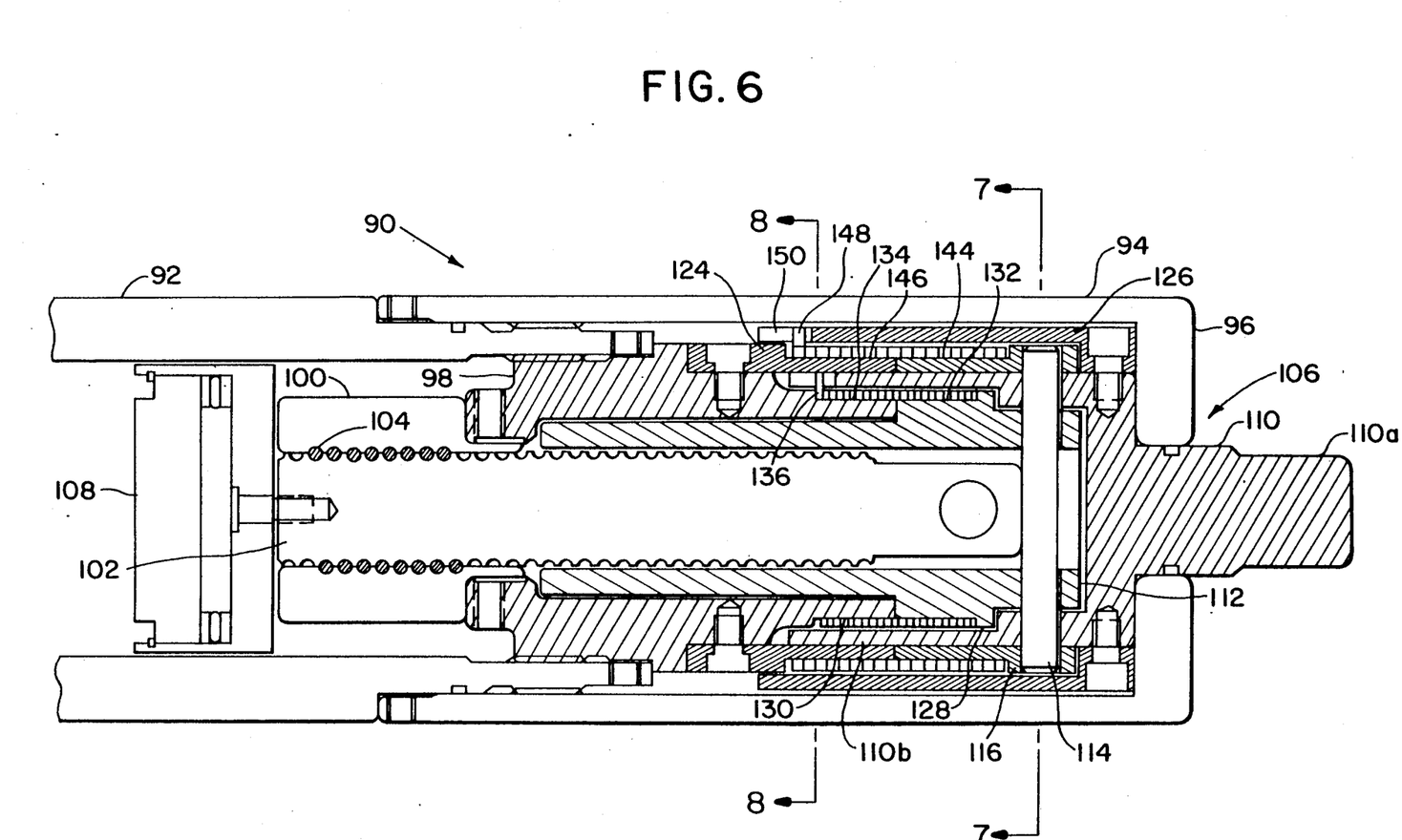
FIG. 6 is a sectional view of a modified form of operator of the present invention in a position in which the operator is not controlling the position of the valve stem.
Figure 7:
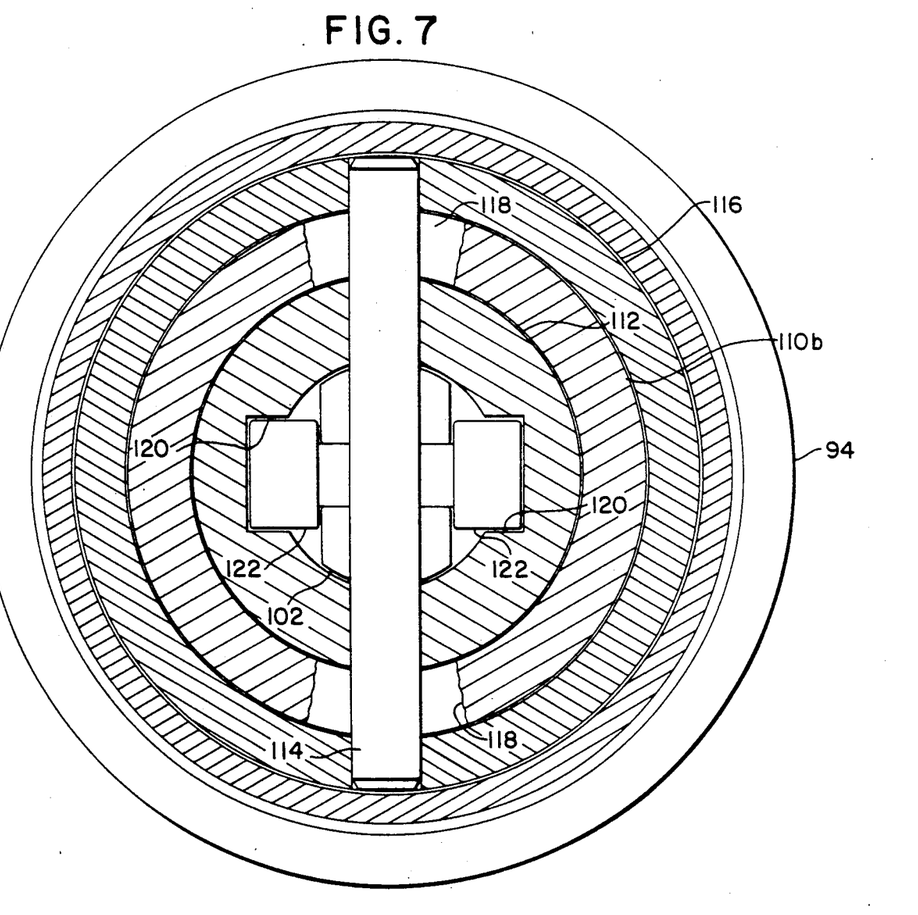
FIG. 7 is a transverse sectional view taken along line 7—7 in FIG. 6 and illustrating the pin connecting the operating sleeve and the shaft guide.
Figure 8:
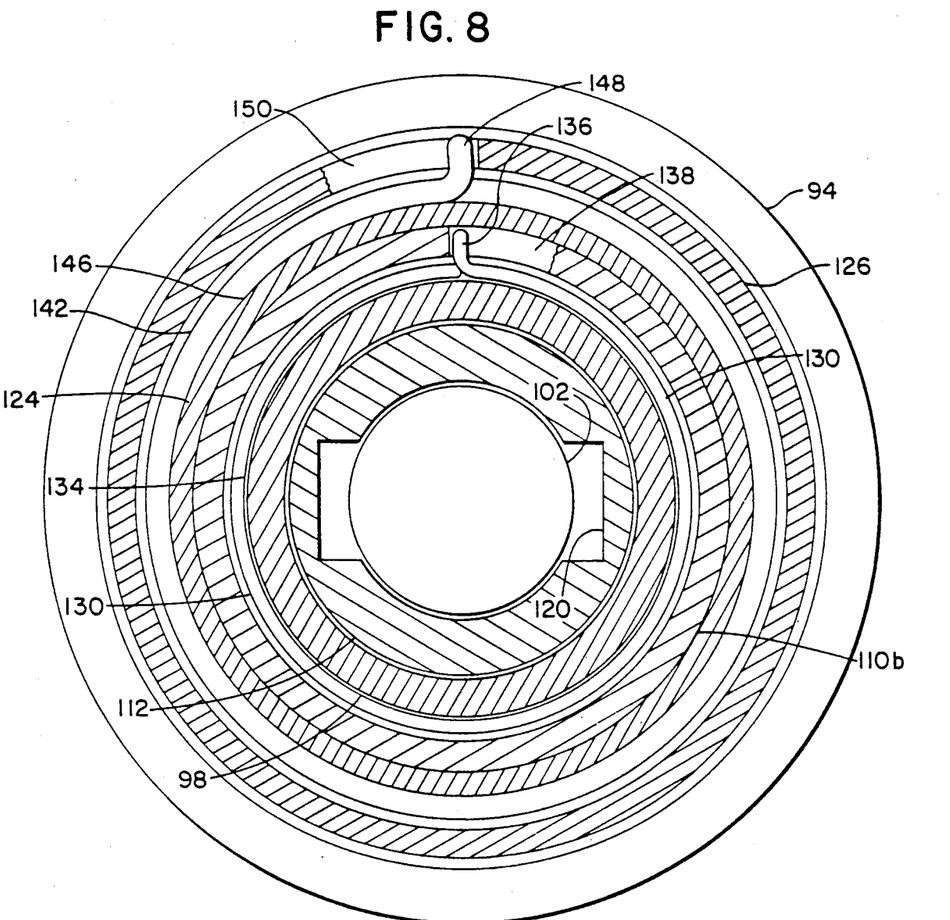
FIG. 8 is a transverse sectional view taken along line 8—8 in FIG. 6 and illustrating the relative positions of the two locking springs.

Manual operator 90 illustrated in FIGS. 6, 7 and 8 is a modified form of operator of the present invention which uses the improved structure of the present invention and achieves the improved performance of the operator of the present invention. Operator 90 includes sleeve 92, which is similar to sleeve 36 previously described, and forms housing 94 with cap 96. Nut sleeve 98 is secured to housing sleeve 92 and to ball nut 100 by any suitable means, such as by threads, as shown in FIG. 6. Ball screw shaft 102 extends through ball nut 100 and includes external grooves which coact with the internal grooves within ball nut 100 and balls 104 to provide a threaded connection. This threaded connection functions to allow ball screw shaft 102 to move inward (to the left as shown in FIG. 6) when ball screw shaft 102 is rotated clockwise by rotation means 106 as hereinafter described. Thrust bearing 108 is secured to the inner end of ball screw shaft 102 to provide a rotating connection between rotating ball screw shaft 102 and the valve stem (not shown) which is to be engaged and retained in its inner position by manual operator 90. Such rotation means 106 includes drive member 110 which extends through the outer end of cap 96 with an external means 110a for receiving a handwheel (not shown) and internal rim 110b which surrounds shaft guide 112 and ball sleeve 98. Pin 114 extends through internal rim 110b, through shaft guide 112 and through adapter sleeve 116 which surrounds a portion of rim 110b. Slots 118 are provided in rim 110b, as best seen in FIG. 7, to allow initial movement of drive member 110 before moving shaft guide 112 for the reasons hereinafter explained. The interior of guide sleeve 112 includes axially extending opposed recesses 120 and rollers 122 which are mounted as projections on opposed sides of ball screw shaft 102 are positioned within recesses 120. Nut sleeve adapter 124 is secured to nut sleeve 98 and is aligned with adapter drive sleeve 116. Outer drive sleeve 126 is secured to drive member 110 and surrounds drive sleeve 116.

In this modified form of the invention, first retaining means 128 includes left hand wound inner spring 130 which coacts with surfaces 132 and 134 on the exterior of shaft guide 112 and nut sleeve 98, respectively, to prevent relative clockwise rotation therebetween. Spring 130 includes tang 136 which is positioned in slot 138 in the inner end of internal rim 110b. Second retaining means 140 includes right hand wound outer spring 142 which coacts with surfaces 144 and 146 on the exterior of adapter drive sleeve 116 and nut sleeve adapter 124, respectively, to prevent counter-clockwise rotation therebetween. Tang 148 on the inner end of spring 142 is positioned within slot 150 on the inner end of outer drive sleeve 126. If drive member 110 is rotated clockwise, the spring 142 will deenergize and rotate freely over the stationary nut sleeve adapter 124. If counterclockwise rotation of shaft 102 is attempted, spring 142 will prevent such rotation. Inner spring 130 is left hand wound to prevent clockwise rotation. Thus, stem 102 is prevented from rotating in either direction unless rotating means 106 is rotated first.

Figure 9:
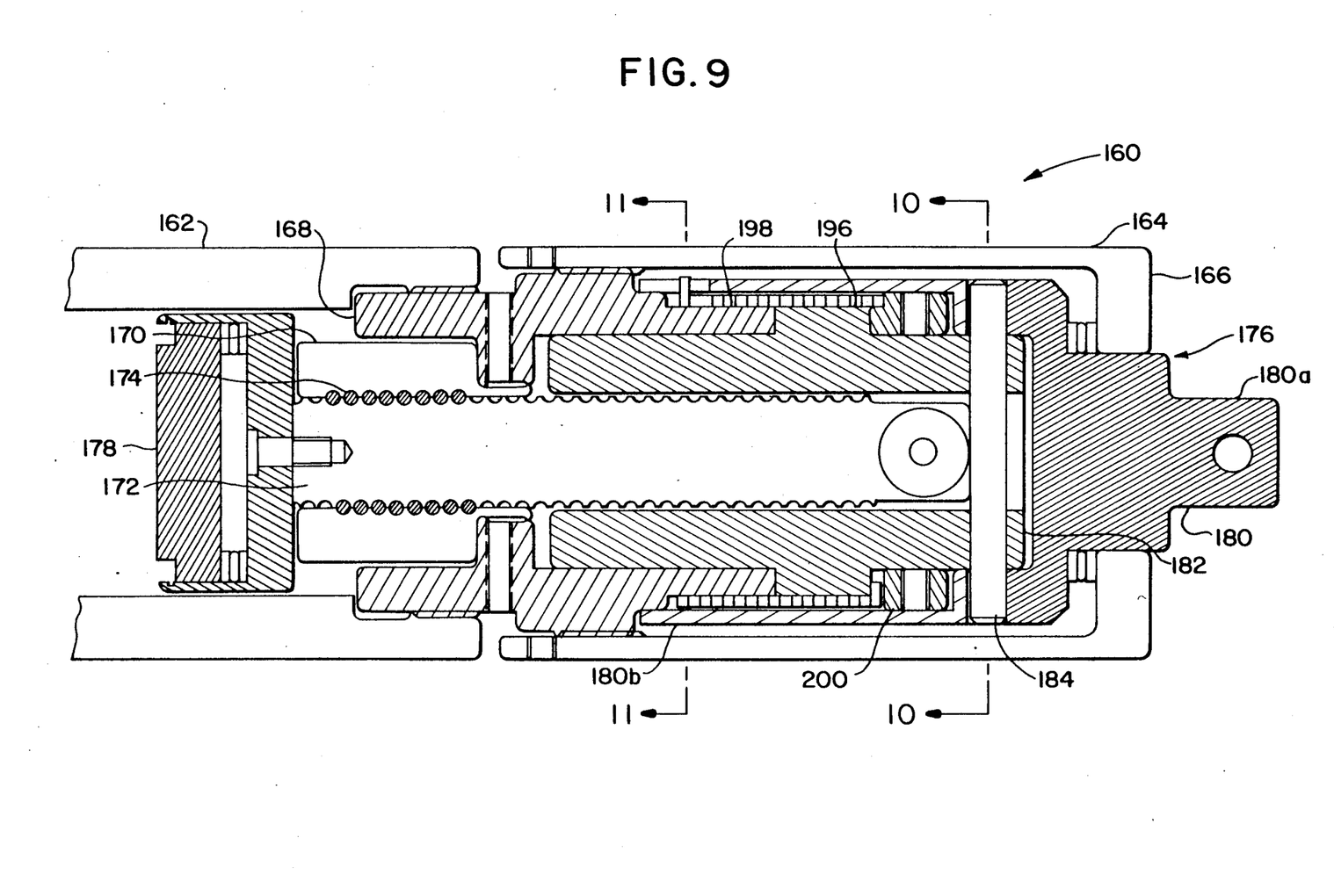
FIG. 9 is a sectional view of another modified form of operator of the present invention in a position in which the operator is not controlling the position of the valve stem.
Figure 10:
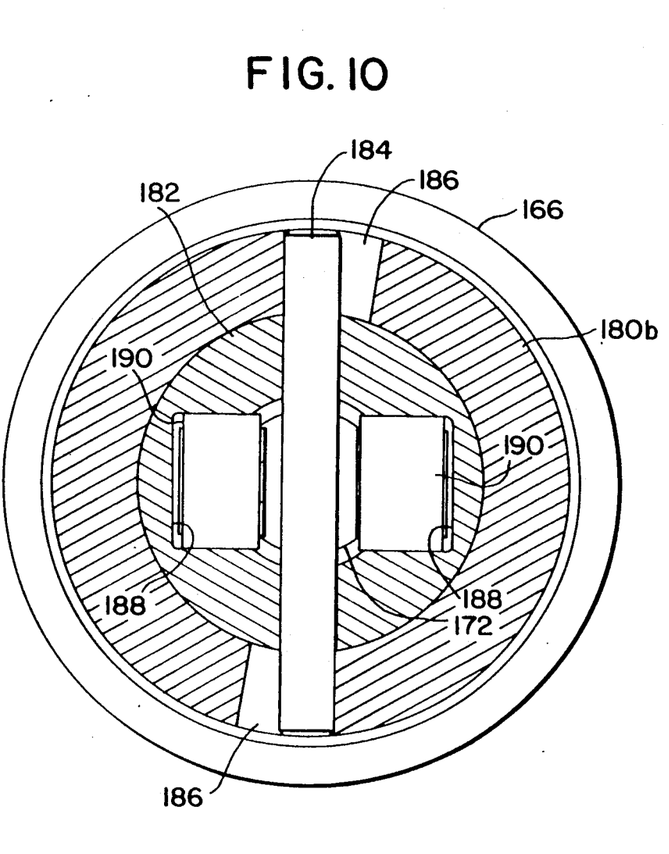
FIG. 10 is a transverse sectional view taken along line 10—10 in FIG. 9 to show the interconnection between the operating sleeve and the ball screw.
Figure 11:
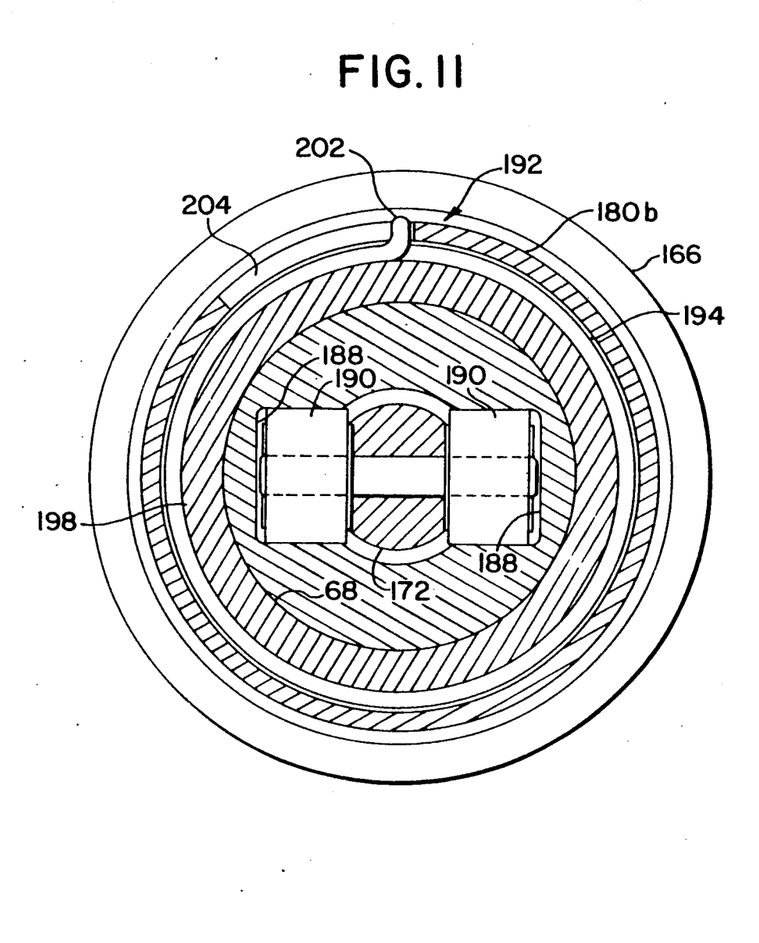
FIG. 11 is a transverse sectional view taken along line 11—11 in FIG. 9 to show the driving connection between the shaft guide and the ball screw.

Manual operator 160 is shown in FIGS. 9, 10 and 11 and is another modified form of the present invention. Manual operator 160 includes sleeve 162, which is similar to sleeves 36 and 90, previously described, and forms housing 164 with cap 166. Nut sleeve 168 is secured to sleeve 162 and to ball nut 170 and nut sleeve 168 is also secured to cap 166, all by suitable means, such as threading. Ball screw shaft 172 extends through ball nut 170 and includes external grooves which coact with internal grooves within ball nut 170 and balls 174 to provide a threaded connection therebetween. This threaded connection functions to allow ball screw shaft 172 to move inward (to the left as shown in FIG. 9) when ball screw shaft 172 is rotated by rotating means 176 as hereinafter described. Thrust bearing 178 is secured to the inner end of ball screw shaft 172 to provide a rotating connection between rotating ball screw shaft 172 and the valve stem (not shown) which is to be engaged and retained in its inner position by manual operator 160. Such rotation means 176 includes drive member 180 which extends through the outer end of cap 166 with external means 180a for receiving a handwheel (not shown) and internal rim 180b which surrounds shaft guide sleeve 182. Pin 184 extends through slots 186 in rim 180b and through shaft guide 182 so that when drive member 180 is rotated in the clockwise direction ball screw shaft 172 moves axially inward into a position retaining the valve stem (not shown) in its lower or inner position. Slots 186 in rim 180b allow initial movement of drive member 180 before moving shaft guide sleeve 182. The interior of shaft guide sleeve 182 includes axially extending opposed recesses 188 and rollers 190, which are mounted as projections on opposite sides of ball screw shaft 172, are positioned in recesses 188 so that ball screw shaft 172 and guide sleeve 182 rotate together.

Retaining means 192 includes spring 194 which closely surrounds exterior surface 196 of guide sleeve 182 and exterior surface 198 of nut sleeve 168. The outer end of spring 194 is secured by ring 200 which is secured to the exterior of guide sleeve 182 and the inner end of spring 194 includes outwardly extending tang 202 which engages in slot 204 on the inner end of rim 180b.

When the form of the invention illustrated in FIGS. 6, 7 and 8, manual operator 90 is suitable for use with a valve a described generally and also is suitable for use by a remote operated vehicle for the operations of a device, such as a subsea valve. All forms of the present invention are useful with valves and chokes.

An advantage of the present invention in its various forms it that it takes almost no torque to disengage the locking spring to allow ready movement either responsive to spring and valve chamber pressure or responsive to manual rotation. In testing the prototype of the present invention, a stem force of 50,000 pounds was applied and the manual rotation required only about 5 lb.ft. torque. Even with such light manual operating torque, the locking action of the spring was positive and the spring remained locked even with a heavy coat of grease between the spring and the rotating surfaces.

Figure 16:
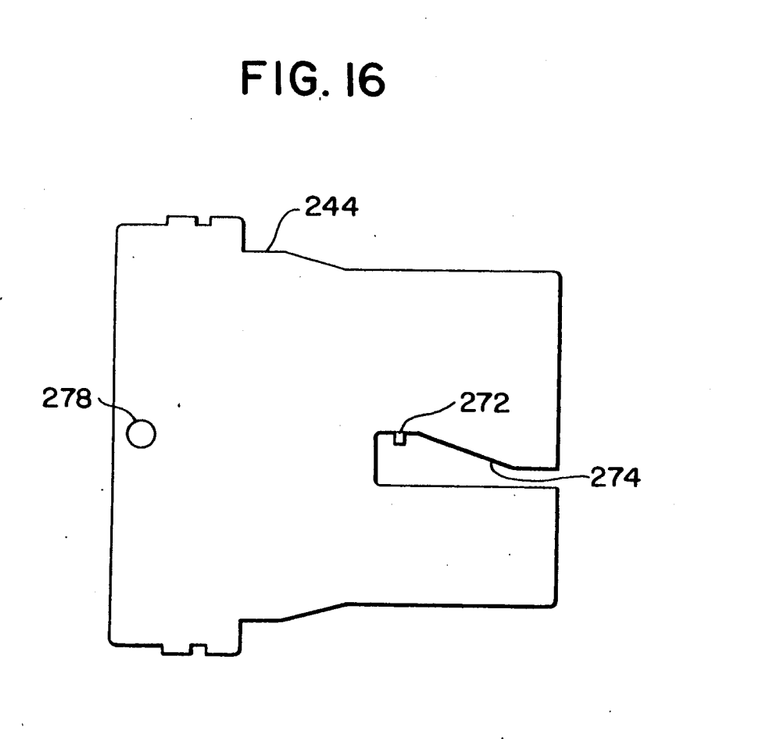
FIG. 16 is a schematic view of the camming ring for the locking spring in its locking position.
Figure 17:
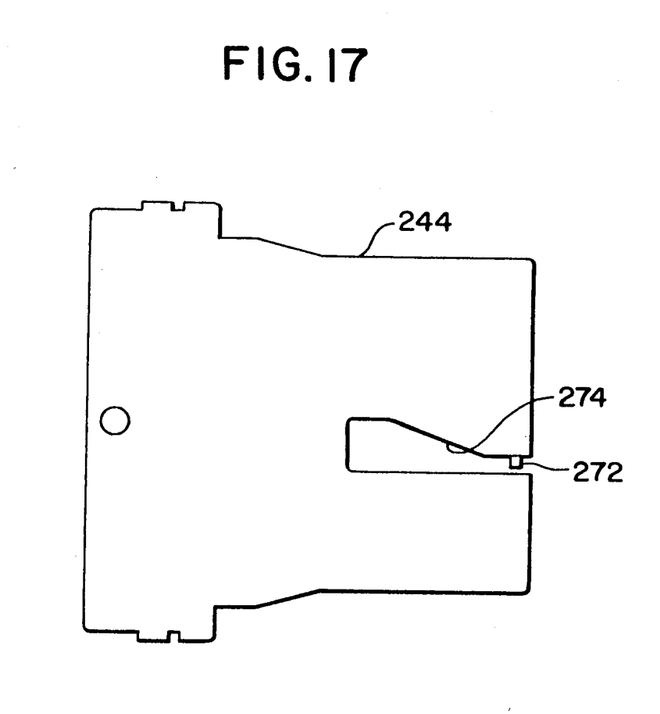
FIG. 17 is a schematic view of the camming ring for the locking spring in its releasing position.
Figure 18:
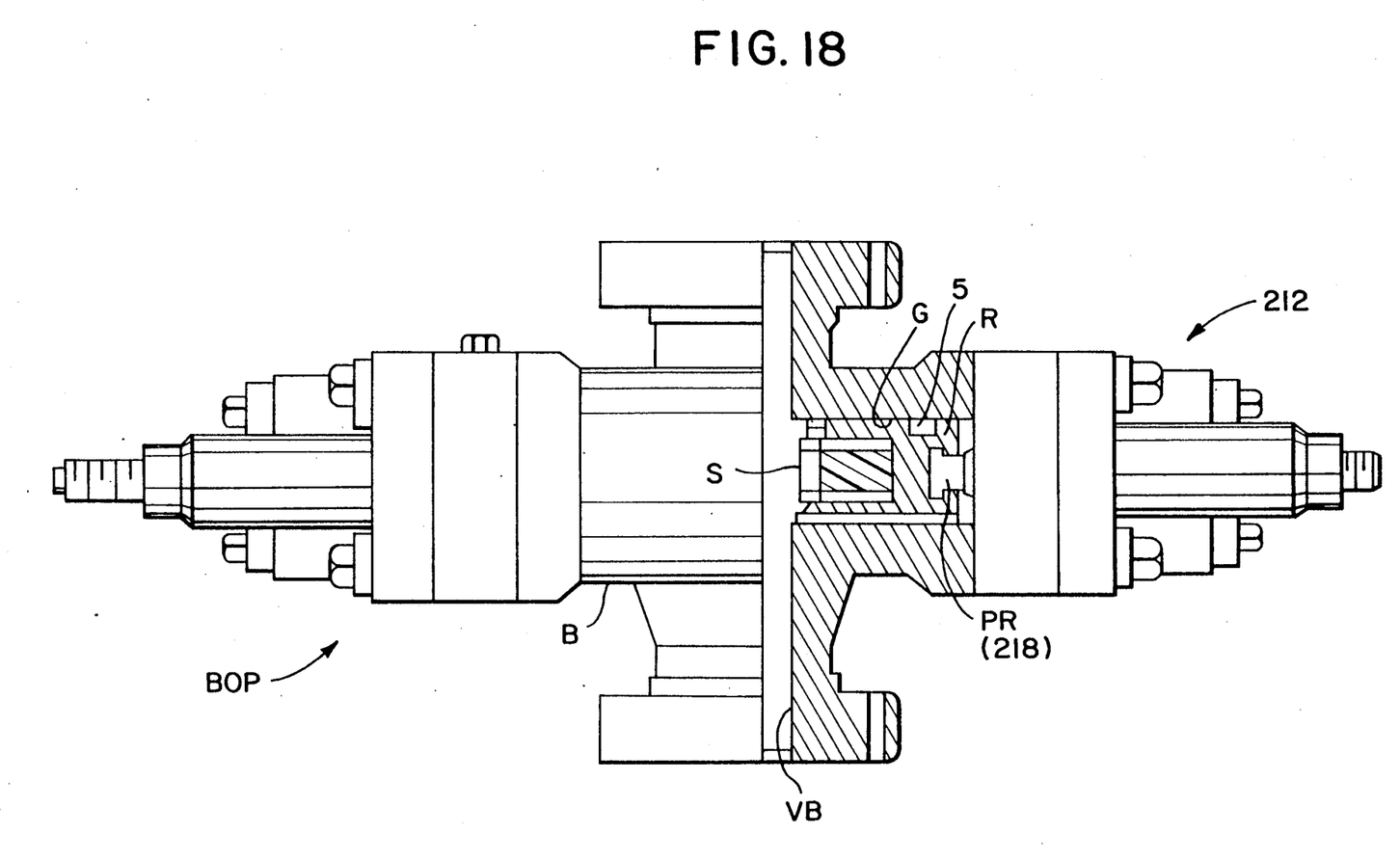
FIG. 18 is a sectional view of a blowout preventer on which the improved apparatus of the present may be used.

Another form of the present invention is illustrated in FIGS. 12 through 18 wherein improved apparatus 210 of the present invention is used in conjunction with the actuator 212 of a blowout preventer BOP shown in FIG. 18. Blowout preventer BOP includes body B having a vertical bore VB extending therethrough with aligned guideways G extending in opposite directions from the vertical bore VB. Rams R are positioned in sliding relationship within guideways G and are moved responsive to pressure delivered to actuators 212. Each ram R includes suitable sealing means S for sealing across the upper portion of its guideway G, for sealing along the side of its guideway G and for sealing against the opposite ram R when the rams R are moved inwardly into engagement with each other across vertical bore VB. In this position rams R provide a sealing closing of the vertical bore in order to maintain control of a well (not shown) to which blowout prevents BOP is secured. Piston rod PR is connected to its ram R and extends into actuator 212 as hereinafter explained.

Figure 12:
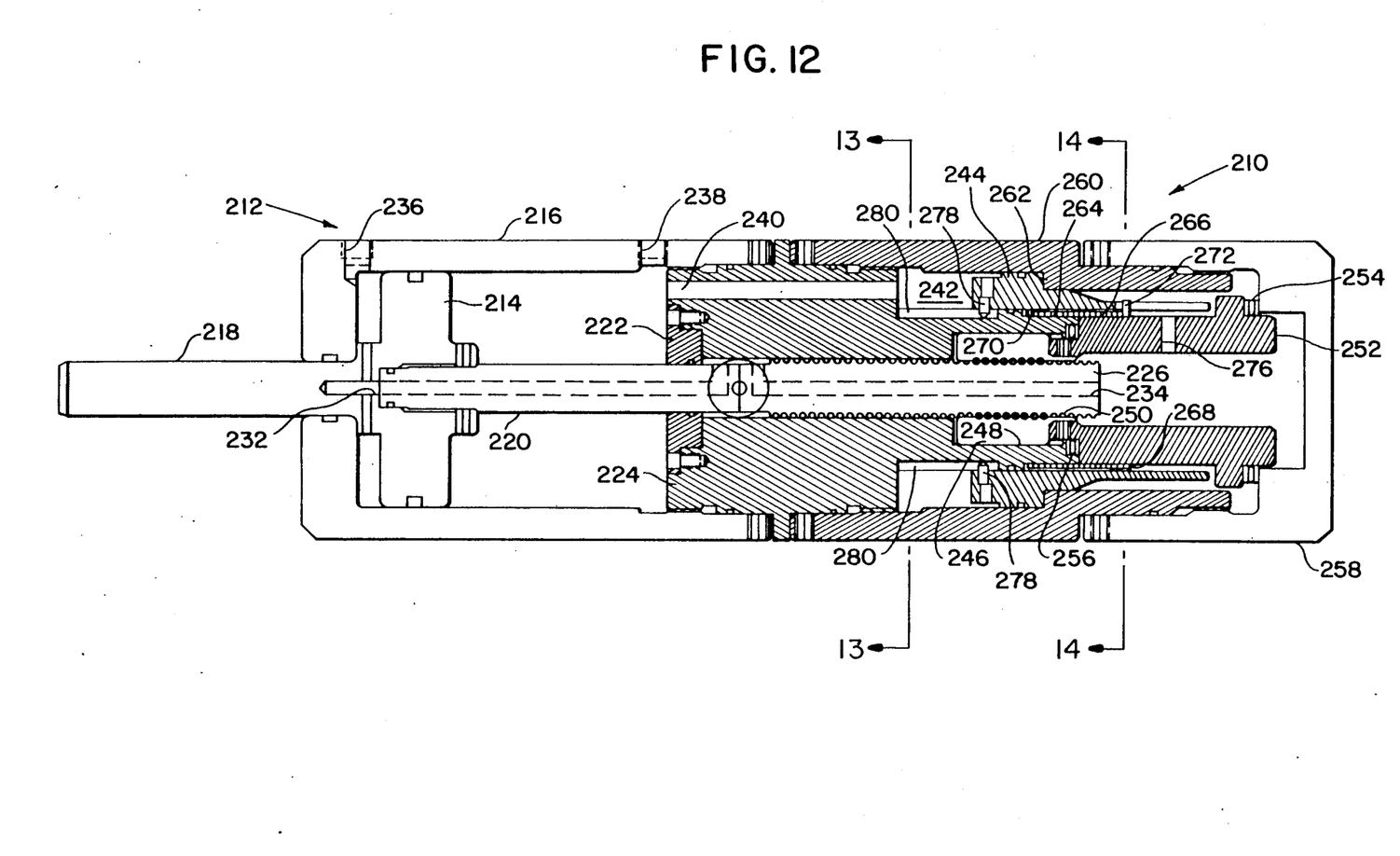
FIG. 12 is an axial sectional view of the actuator on one side of a blowout preventer having the improved shaft locking device of the present invention mounted thereon and showing the piston and tail rod of the blowout preventer ram being in its inner position.
Figure 13:
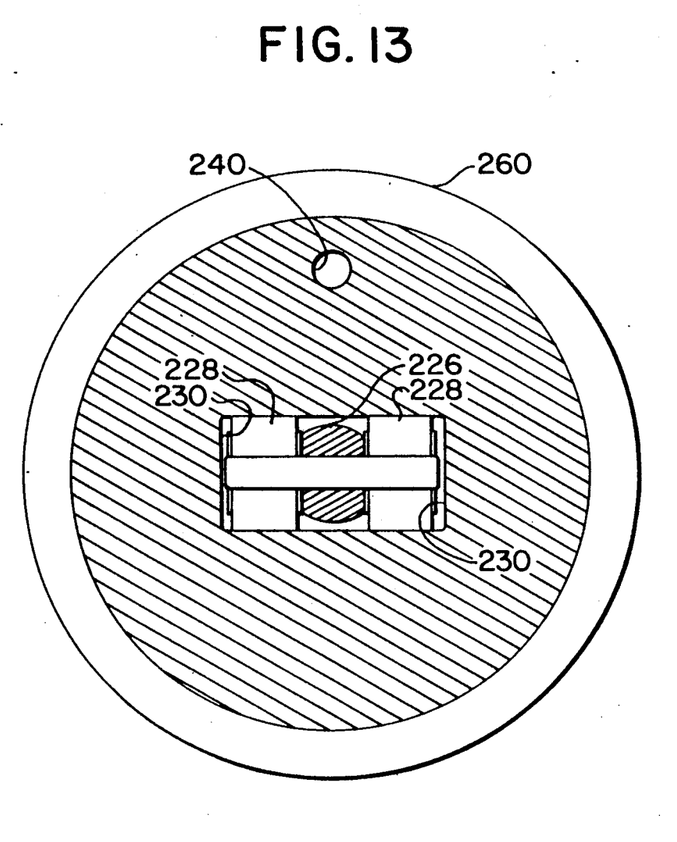
FIG. 13 is a sectional view taken along line 13—13 in FIG. 12 to illustrate the ball screw shaft and shaft guide.
Figure 14:
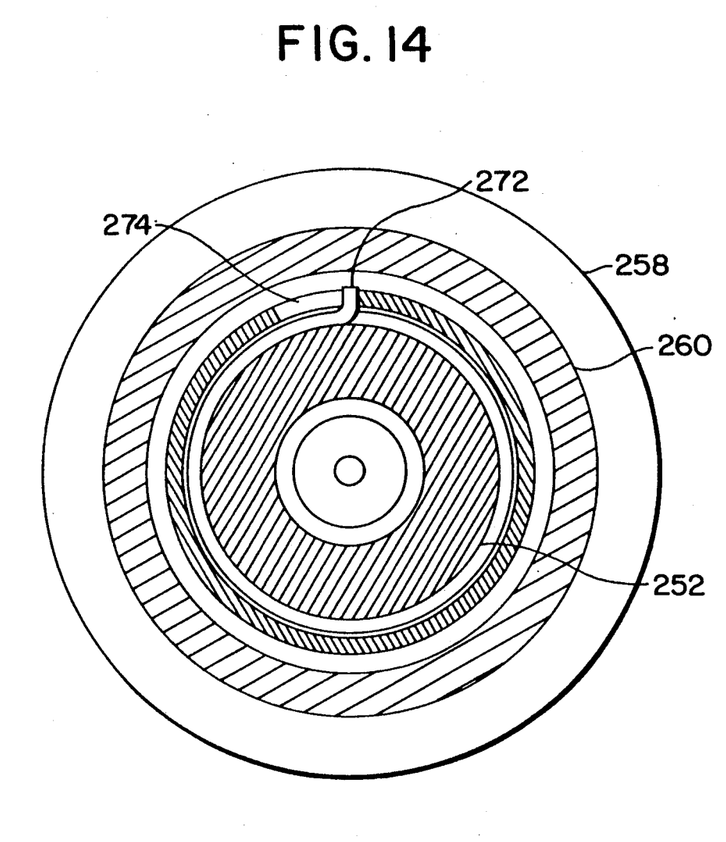
FIG. 14 is a sectional view taken along line 14—14 in FIG. 12 and showing the locking spring and its outwardly extending radial tang.

Piston 214 of actuator 212 is positioned within housing 216 through which piston rod (PR) 218 extends in the direction away from piston 214 and tail rod 220 extends away from piston 214 in the opposite direction. Collar 222 is secured in the end of shaft guide 224 and seals around tail rod 220 which forms ball screw shaft 226 and has rollers 228 projecting on each side to engage within slots 230 in the interior of shaft guide 224. Inner bore 232 extends through tail rod 220 to a point approaching rollers 228 and then communicates around the roller section to the outer bore 234 which extends the remainder of the length of tail rod 220. The inner end of inner bore 232 communicates with the interior of housing 216 on the inner side of piston 214. Port 236 in housing 216 communicates with the interior of housing 216 and the inner side of piston 214. Port 238 in housing 216 communicates with the interior of housing 216 on the outer side of piston 214. Passage 240 extends through shaft guide 224 into pressure chamber 242 on the inner side of camming ring 244 from the housing on the outer side of piston 216. Ball nut 246 is positioned within outer rim 248 of shaft guide 224 and balls 250 provide the connection between the grooves on the exterior of shaft 226 and the grooves on the interior of ball nut 246. Ball nut collar 252 is secured to ball nut 246 and is provided with suitable bearings 254 and 256 between collar 252 and housing cap 258 and between collar 252 and outer rim 248. Thus ball nut 246 and ball nut collar 252 are rotatably mounted with respect to the remainder of the structure of apparatus 210. Housing 216 is completed by housing member 260 and housing cap 258. Housing member 260 is secured to the exterior of guide 224 and includes inwardly facing shoulder 262 which functions as a stop for the movement of camming ring 244 and has cap 258 secured to the outer end of housing member 260.

Figure 15:
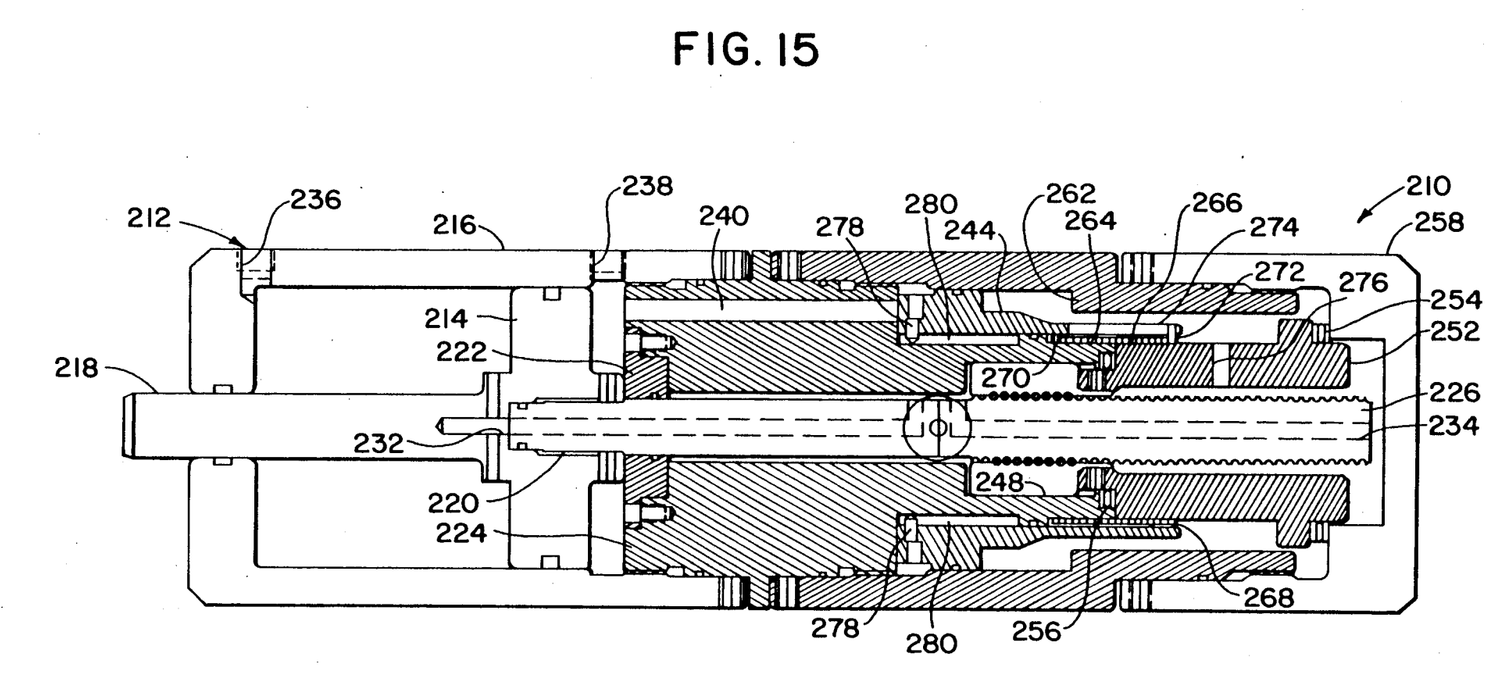
FIG. 15 is an axial sectional view similar to FIG. 12 with the piston and tail rod of the blowout preventer ram being in its outer position (with the blowout prevent ram open).

Cylindrical surface 264 is provided on the exterior of outer rim 248 of guide 224 and cylindrical surface 266 which has the same diameter as surface 264 and is axially aligned with surface 264. Surface 266 is provided on the exterior of ball nut collar 252. Locking spring 268 is positioned in tight surrounding relationship to surfaces 264 and 266 and has its inwardly projecting tang 270 secured within outer rim 248 of shaft guide 224 and has its outwardly projecting tang 272 extending above surface 266 and into camming slot 274 of camming ring 244. Port 276 extends through nut collar 252 to provide communication to the pressure chamber on the outer side of camming ring 244. Pin 278 extends inward as shown in FIGS. 12 and 15 and engages within slot 280 in the exterior of outer rim 248 of shaft guide 224. This prevents camming ring 244 from rotating during movement to ensure that it properly cams tang 272.

As shown in FIGS. 16 and 17 camming ring 244 has camming slot 274 which is wide at its inner end so that locking spring 268 is allowed to tightly engage surfaces 264 and 266 but on its outer end it is relatively narrow and cams tang 272 in the direction which allows locking spring 268 to slightly enlarge so that there can be relative rotation between surfaces 264 and 266 in both directions.

From the foregoing it can be seen that when pressure is applied through port 236 it is exerted on the inner surface of piston 214 to urge it outward. It is also transmitted through bores 232 and 234 to the space at the outer end of tail rod 220 within nut collar 252 and through port 276 in collar 252 to urge camming ring 244 inward so that tang 272 is positioned in the narrow portion of camming slot 274. This cams tang 272 in the direction which causes locking spring 268 to slightly increase its inner diameter so that it allows relative movement between surfaces 264 and 266. When pressure is applied through port 238 to be exerted on the outer side of piston 214 it is also transmitted through passage 240 to urge camming ring 244 outward. This movement of camming ring 244 positions tang 272 in the wider portion of camming slot 274 to allow locking spring 268 to resume its normal tight engagement with surfaces 264 and 266. In this position relative rotation between surfaces 264 and 266 is prevented in the direction opposite to the winding of spring 268 but allows relative rotation in the direction of the winding of the spring. This allows the inward movement of piston 214 and tail rod 220 and when they reach their inner position, locking spring will set and prevent the reverse rotation. In this manner the improved apparatus of the present invention can provide a simple but effective locking of blowout preventer ram in their closed positions.

In describing the operation of the locking spring, it is considered that it might be wound as a right hand spring or a left hand spring and when the relative rotation of the surfaces is such that they tend to tighten the spring coils they will lock and when the rotation is in the opposite direction the spring coils will release. Otherwise rotation is provided in the locking direction only when tang 272 is moved to the release position of the narrow portion of the camming slot 274.

It should be noted that the present invention illustrates the use of ball nut and ball screw shaft to provide a highly efficient connection which allows low torque in its rotation. It should be noted that any other type of high efficiency connection could be used which would function as an overhauling connection.

What is claimed is:

1. A manual operator for use with a valve having a valve body, a valve member controlling flow through the valve, a valve stem connected to the valve member and moving therewith between relative positions, the valve stem having an outer end which is engageable from the exterior of the valve body, said operator comprising a housing having means to connect to the valve body in a position surrounding and aligned with the valve stem, a ball nut, a ball screw shaft, balls interconnecting the ball nut and the ball screw shaft so that relative rotation causes axial movement of the shaft, means for rotating one of the ball nut and the ball screw shaft, means for retaining the other of the ball nut and the ball screw shaft against rotation to cause the ball screw shaft to move axially into position engaging the end of the valve stem with the valve member in its innermost position, a locking spring engaging a rotary surface and a stationary surface in the relaxed position of the spring to prevent relative rotation between such surfaces, and means associated with said rotating means to move said spring out of retaining engagement with at least one of said surfaces during initial movement of said rotating means to allow axial movement of said ball screw shaft.

2. A manual operator according to claim 1 including a guide sleeve surrounding said ball screw shaft, and means providing interengagement between said sleeve and said ball screw shaft to retain said shaft against relative rotation with respect to said sleeve.

3. A manual operator according to claim 1 wherein said ball screw shaft is retained against rotation, and said ball nut is rotated around said ball screw shaft by said rotating means.

4. A manual operator according to claim 1 wherein said ball nut is retained against rotation with respect to said ball screw shaft, and said ball screw shaft is rotated within said ball nut by said rotating means.

5. A manual operator according to claim 1 including said locking spring is a first locking spring, a second locking spring engaging a stationary surface and a rotational surface in its relaxed position to prevent relative rotation between such surfaces, said second locking spring preventing relative rotation of the ball nut and the ball screw shaft in the opposite direction from the direction of rotation which said first locking spring prevents.

6. A manual operator according to claim 1 including bearing means to reduce the friction load of rotation by said rotating means.

7. A manual operator according to claim 6 wherein said bearing means is positioned between the outer end of said valve stem and the end of said ball screw shaft facing said outer end of said valve stem.

8. A manual operator according to claim 6 wherein said bearing means is positioned within said housing between rotating and stationary components of said operator in said housing.

9. A manual operator according to claim 1 including a rotary cap being a portion of said rotating means and extending to the exterior of said housing for receiving suitable apparatus to allow manual rotation thereof.

10. A manual operator according to claim 2 wherein said interengagement means includes at least one slot in said guide sleeve, and a projection from said ball screw shaft engaging within said slot to prevent relative rotation of said shaft and said guide sleeve.

11. A manual operator according to claim 2 wherein said interengagement means includes two opposed slots in said guide sleeve, and two projections extending from said ball screw shaft and engaging within said slots to prevent relative rotation of said shaft and said guide sleeve.

12. A shaft locking apparatus for use with a device having an axially movable shaft and means for moving the shaft, the shaft having an engageable end, said apparatus comprising a housing having means to connect to the device in a position surrounding and aligned with the shaft, a ball nut, a ball screw shaft, balls interconnecting the ball and the ball screw shaft so that axial movement of the shaft and relative rotation are interdependent, one of said ball nut and said ball screw shaft being rotatable, the other of said ball nut and said ball screw shaft being held stationary, a first cylindrical surface associated with said ball nut, a second cylindrical surface associated with said ball screw shaft, said first and second surfaces having the same diameter and being aligned with each other, a locking spring tightly engaging said surfaces to prevent relative rotation therebetween in one direction and to allow such rotation in the opposite direction, and means for releasing the tight engagement of the locking spring with the surfaces to allow the relative rotation therebetween which is prevented without such release.

13. An apparatus according to claim 12 wherein said device is a blowout preventer.

14. An apparatus according to claim 13 wherein said releasing means includes a pressure responsive camming ring for engaging said locking spring to effect its release.

15. An apparatus according to claim 14 including an actuator for the rams of said blowout preventer having a piston, a piston rod, a tail rod and means for delivering pressure fluid to opposite sides of said piston, said tail rod is integral with said ball screw shaft, and means for directing the pressure fluid applied to the piston to actuate the camming ring.

16. A shaft locking apparatus for use with a device having an axially movable shaft and means for moving the shaft, the shaft having an engageable end, said apparatus comprising a housing having means to connect to the device in a position surrounding and aligned with the shaft, a first cylindrical surface, a second cylindrical surface, said first and second surfaces having the same diameter and being aligned with each other, means retaining one of said cylindrical surfaces against rotation, means interconnecting said shaft and the other of said cylindrical surfaces wherein the movements of said shaft and said other surface are interdependent, a locking spring tightly engaging said surfaces to prevent relative rotation therebetween in one direction and to allow such rotation in the opposite direction, and means for releasing the tight engagement of the locking spring with the surfaces to allow the relative rotation therebetween which is prevented without such release.

17. A shaft locking apparatus according to claim 16 wherein said interconnecting means includes
   means translating axial movement of said shaft into rotation of the other of said surfaces.

18. A shaft locking apparatus according to claim 16 wherein said interconnecting means includes
   means translating rotation of the other of said surfaces into axial movement of said shaft.

* * * * *